United States Patent [19]

Pebeyre et al.

[11] Patent Number: 4,537,613

[45] Date of Patent: Aug. 27, 1985

[54] PRODUCT FOR THE FERTILIZATION OF MYCORHIZAL MUSHROOMS AND APPLICATION TO THE FERTILIZATION OF TRUFFLE-BEDS

[75] Inventors: Pierre-Jean Pebeyre, Cahors; René Gleyze, Valreas; Charles Montant, Toulouse, all of France

[73] Assignee: S. A. Pebeyre, Cahors, France

[21] Appl. No.: 572,013

[22] Filed: Jan. 19, 1984

[30] Foreign Application Priority Data

Jan. 21, 1983 [FR] France ................. 83 01049

[51] Int. Cl.$^3$ ............................................. C05F 13/00
[52] U.S. Cl. ............................................. 71/5; 47/1.1
[58] Field of Search ............................. 47/1.1; 71/5

[56] References Cited

U.S. PATENT DOCUMENTS 3,086,320  4/1963  Heinemann ............... 71/5 X
3,996,038  12/1976  Toth et al. ................ 71/5
4,127,964  12/1978  Mee .......................... 71/5 X

OTHER PUBLICATIONS

CA 100(1):5235y, 1982, Dupre et al., "Effect of Nitrogen . . . Conditions".

*Primary Examiner*—Ferris H. Lander
*Attorney, Agent, or Firm*—Harold H. Dutton, Jr.

[57] ABSTRACT

The invention concerns a fertilizer to enhance the mycorhization and the fructification of mycorhizal mushrooms, in particular the tuber melanosporum. This fertilizer includes a mixture of non-ferment organic substances of animal origin (ovine excrements, fowl droppings, dried blood or feather powder), of organic substances of vegetable origin and essentially proteins and carbohydrates (in particular grains, flours, oil or cattle cakes or vegetable wastes from soy, cotton, wheat, rice, ricinus) and at least one alkalizing compound suitable to provide the mixture with a pH higher than 8; the mutual proportions of the ingredients are adjusted so that the C/N ration of the mixture is at least 10.

16 Claims, No Drawings

PRODUCT FOR THE FERTILIZATION OF MYCORHIZAL MUSHROOMS AND APPLICATION TO THE FERTILIZATION OF TRUFFLE-BEDS

The invention concerns a fertilizer to enhance the mycorhization and/or the fructification of mycorhizal mushrooms; it applies in particular to the black truffle (tuber melanosporum) and to using said product to fertilize truffle beds.

To date, there is no product capable of significantly enhancing the formation and growth of black truffles.

The present invention has an object to provide such a product of which the effectiveness has been experimentally shown both in forming roots in the vegetable substrate and mushrooms and the mushroom mycorhizas, and in fructifying the mushroom.

The fertilizer of the present invention is beneficial not only with respect to the tuber melanosporum but also other mushrooms capable of mycorhizing the vegetables (ascomycetes, basidiomycetes), and includes in its basic formula a mixture of the following substances:

a non-fermented organic matter of animal origin, in particular consisting of fresh animal excrements, preferably ovin excrements and/or fowl droppings or dried blood or feather powder;

organic substances of vegetable origin, essentially from proteins and carbohydrates, consisting in particular of grains, flours, oil or cattle cakes or vegetable wastes, which are derived in particular but not solely from soy, cotton, wheat, rice, ricinus, maize (in particular "cornsteep" extracts;

at least one alkalizing compound, preferably a crude or baked calcium compound, suitable to provide the mixture with a pH in excess of 8 and advantageously roughly from 10 to 13.5.

The mutual proportions of the ingredients are adjusted so the mixture has a C/N ratio of at least 10 and preferably between 11 and 14.

In particular the proportion by weight of the organic matter of animal origin to the total weight of organic matter advantageously is between about 50% and 20%.

The mixture of calcium compounds can be a mixture of crude and baked products, in particular in the overall approximate ratio of 5 to 15%. Again it is possible to provide a calcium compound which can be assimilated by the flora gradually and long-term (several years).

Furthermore, additives can be fed into the above-described basic product to further increase its effectiveness, in particular a magnesium salt in a proportion by weight less than 10% and preferably obtained from dolomite or maerl, or also a potassium salt, again present in a proportion by weight less than 10%.

The recipe below provides excellent results for most applications (the proportions indicated are by weight):

| | |
|---|---|
| potassium salt | from 0.5 to 5% |
| magnesium salt | 3 to 5% |
| calcium compounds | 5 to 15% |
| grains, oil or cattle cakes and/or vegetable wastes | 20 to 50% |
| ovin excrements and/or fowl droppings | remaining %. |

The fertilizer of the invention can be prepared by several recipes observing the range indicated above, the actual precise values being adjusted as a function of the ground to which the product is fed and of the climate.

The invention extends to a process for fertilizing truffle beds using the above-defined product; this process consists in spreading said product preferably in amounts between 0.3 and 3 kg/m². This scattering is advantageously performed at the end of each harvest, the amount of the first scattering being the larger.

It has been observed that the truffle-bed fertilization so carried out with the product of the invention increases production yields sometimes in considerable manner and in some instance even triggers a production otherwise absent without such fertilization. The increase in yield in truffles for already producing truffle-beds varied in the different experiments, however this yield always increased substantially: this yield was multiplied by a factor of 1.5 to 15 depending on the condition of the truffle-beds to which the invention was applied; on the average the obtained yield was increased by a factor about 3 to 4; this is a remarkable performance, quite unexpected, which no product was ever capable of achieving.

Moreover, it was observed that the average size of the truffles was significantly and substantially increased and that they assumed a more regular shape: keeping the weight constant, this grade so obtained substantially increases the commercial value of the production. Also, the fertilizer evinces a selective effect in favor of the black truffle (tuber melanosporum) which is the most sought-after truffle in France.

The above stated invention and its accomplishments are illustrated below in relation to the following diverse examples.

These implementations were carried out either on truffle-beds of which the productivity was accidental or even zero, or on already-producing truffle-beds that were efficiently kept up: cutting trees, conventional soil work, spreading herbicides, mechanical soil aeration, dry-season irrigation and mulching.

Other experiments not cited hereunder were also carried out but without accurate quantification, in the case of wild truffle-beds. The fertilization using the product of the invention always enabled to increase or resume production; it should be noted that the multiplying factor was found to be highly variable.

EXAMPLE 1

(a) The recipe by weight of the fertilizer used in this example is as follows:

| | |
|---|---|
| dried, non-fermented chicken droppings | 60% |
| paddy (rice hulls) | 20% |
| chalk | 3% |
| dolomite | 15% |
| potassium sulfate | 2% |

The chicken droppings were fresh, having been dried in warm air and reduced to powder.

The paddy consisted of rice hulls from rice decortication, being untreated.

The chalk was admixed as a fine powder.

Dolomite is a natural mixture of calcium and magnesia carbonate (containing about 20% magnesia carbonate) and is in the form of a fine powder.

The potassium sulfate was in the form of commercial granulates.

All of these ingredients were thoroughly mixed in mechanical manner; the fertilizer pH was 10.5 and its C/N ratio was 13.2.

This example concerns the application of the product to a 30-year old truffle-bed formed around a holm oak (cursus ilex); the brulee (the zone around the tree without vegetation) was hardly obvious and stretched around the tree in a radius of 5 to 10 m. The truffle-bed was located at an altitude of 150 m above sea level.

(b) The annual production prior to fertilization was roughly 75 to 100 g of Perigord black truffles (tuber malanosporum); on the average the truffles weighed 25 to 30 g. These are mean values estimated over several years.

Such productivity is typical of a truffle-bed of mediocre yield; it should be noted that another type of truffles (tubremoscatum), which is little edible, was mixed with the black truffles.

The terrain was flat and made up of modern, muddy and drained alluvial deposits, its C/N ratio was 8.74 and its pH was 7.6.

(c) The above-described fertilizer was spread on the brulee and on an annulus of about 1 m surrounding the brulee. The scattering was at the rate of 2 kg/m$^2$ immediately upon the end of the harvest.

Thereupon the soil was worked mechanically to turn it over by a depth of 15 cm approximately and to mix their fertilizer with the soil. The C/N ratio and the pH of the soil as measured one month after the spreading respectively were 9.5 and 8.33.

A slight increase was noted in the crop the year after, but the results were not quantified.

A new spreading, termed of maintenance, of 0.8 kg/m$^2$ of product was carried out after that harvest. The C/N ratio and the pH of the soil following one month after this spreading respectively were 10 and 8.33.

The following harvest (2 years after the first spreading) provided about 1 kg of black truffles each weighing from 25 to 100 g; the other truffle species disappeared.

Accordingly the yield had increased by a factor of 10-13, with much larger average truffles (hence of higher commercial value) being obtained, and with excellent selectivity in favor of the black truffle.

(d) A neighboring truffle-tree (some 50 m away) with the same appearance was used as the control during the second harvest year.

Its production (without fertilizer) remained mediocre, about as stated in (b) above.

EXAMPLE 2

(a) The fertilizer used had the following recipe by weight:

| | |
|---|---|
| chicken droppings (similar to the above) | 47% |
| paddy | 35% |
| agricultural lime | 3% |
| dolomite | 13% |
| potassium sulfate | 2% |

The mixture so obtained evinced a pH of 10.5 and C/N ratio of 12.7.

This example concerns the application of the product to a truffle-bed located on a terrain adjacent to the previous one, which is 30 years old and surrounds two stalked oaks, so-called Michelin oaks. The brulee was cleared (without any vegetation) and its area around the trees was 10 m$^2$.

(b) Before fertilization, annular production was good, of about 800 to 1,100 g of black truffles each weighing from 25 to 100 g. No other truffle species was present at all.

(c) The first fertilizer spreading was performed as before but in lesser amounts, about 1 kg/m$^2$. The C/N ratio and the pH of the soil, measured one month after spreading, respectively were 10 and 8.6.

Maintenance spreading was performed with rates of about 0.5 kg/m$^2$. At the end of the second year the harvest was two kilograms of truffles of which the weight was between 80 and 300 g.

Accordingly the production went up by a factor of about 2 and the truffles were much larger, increasing the commercial value of the production by at least 20%.

(d) A neighboring truffle-tree which was approximately identical was considered being the control (no fertilization) and went on providing an average production of the same magnitude as stated in (b) above.

EXAMPLE 3

(a) The fertilizer of this example is the same as in the above Example 2.

This example concerns applying the product to an excellent truffle-bed which is 30 years old and comprising two cursus pubescence oaks. The brulee stretched by about 44 m$^2$ around the trees.

(b) Truffle production was very scant at the center of the brulee; this is normal, the truffles being harvested essentially at the periphery.

Prior to fertilization the annular truffle production was about 1.8 kg, the truffles being 50 to 300 g; no other truffle kind at all had been harvested.

(c) In this example, both the first fertilizer spreading and the maintenance spreading were at the rate of 0.8 kg/m$^2$ over the entire brulee area. The ground C/N ratio and pH value one month after spreading respectively were 10.5 and 8/8/.

It was noted that the peripheral production of the brulee was substantially improved, and most importantly that supplementary production took place at the brulee center near the trees (an increase in producing area).

The second year, the crop was about 3 kg, with the average truffle size being significantly shifted towards the maximum.

In this example of already well-producing truffle-beds, the fertilizer caused an increase in the producing area, an increase in the harvest by a factor of about 1.6 and an increase in the number of big truffles.

EXAMPLE 4

(a) In this example the fertilizer was the following:

| | |
|---|---|
| (non-fermented) ovine excrements | 50% |
| soy oil or cattle cakes | 15% |
| paddy | 15% |
| chalk | 3% |
| dolomite | 15% |
| potassium sulfate | 2% |

The mixture so obtained had a C/N ratio of 13.5 and a pH of 13.

This example concerns the application of the product to a truffle bed at an altitude of 450 m, 35 years old and comprising three cursus pubescens oaks. The brulee stretched 12 m² around the trees.

(b) Truffle growth was very scarce and accidental, being restricted to 2-3 small truffles a year.

(c) Both fertilizer spreading and the maintenance spreading were carried out at a rate of 2 kg/m². The C/N ratio and the pH of the ground one month after spreading respectively were 12 and 8.5.

A crop of about a dozen truffles was collected the first year.

The second year, the crop was about 3 kg of truffles with a mean weight of 50 g and with good uniform shapes.

Accordingly the fertilizer of the invention made it possible to resume growth of this truffle bed.

In general the spreading of the fertilizer of the invention is carried out as a function of the ground in order to obtain a ground with a pH approximately between 8 and 9 and a C/N ratio approximately between 10 and 12.

In the examples above, the fertilizers were in the form of a solid of fine particulates; these fertilizers also can be dissolved in water and be used in liquid form when irrigating.

We claim:

1. A fertilizer for enhancing the mycorhization and/or the fructification of mycorhizal mushrooms selected from the group consisting of tuber melanosporum, consisting essentially of a mixture of non-fermented organic substances of animal origin, organic substances of proteins and carbohydrates of vegetable origin, and at least one alkalizing compound selected from the group consisting of calcium compounds for raising the pH value of the mixture so that the mixture has a pH value greater than 8, the mutual proportions of the organic substances being adjusted so that the mixture has a C/N ratio of at least 10.

2. A fertilizer as in claim 1, wherein the organic substances of animal origin are selected from the group consisting of ovine excrements, fowl droppings, dried blood, and feather powder.

3. A fertilizer as in claim 1, wherein the organic substances of vegetable origin consist of grains, flours, oil or cattle cakes or vegetable wastes.

4. A fertilizer as in claim 3, wherein the organic substances of vegetable origin are derived from vegetables such as soy, cotton, wheat, rice, ricinus, maize.

5. A fertilizer as in claim 1 characterized in that the ingredients are present in such mutual proportions in the mixture that the C/N ratio of the mixture is between 11 and 14.

6. A fertilizer as in claim 5, characterized in that the alkalizing compound(s) is (are) adjusted in such a proportion that the pH of the mixture is about 10 to 13.5.

7. A fertilizer as in claim 1, characterized in that the proportion by weight of the organic substances of animal origin with respect to the total weight of the organic substances is approximately between 50% and 80%.

8. A fertilizer as in claim 1, characterized by using a mixture of crude or baked calcium compounds as the alkalizing compounds.

9. A fertilizer as in one of claim 1, characterized by containing about 5 to 15% by weight of calcium compounds.

10. A fertilizer as in claim 1, characterized by containing a magnesium salt in an amount less than 10% by weight.

11. A fertilizer as in claim 10, characterized in that the mixture is prepared from dolomite or maerl.

12. A fertilizer as in claim 1, characterized by including a potassium salt in an amount less than 10% by weight.

13. A fertilizer as in claim 1, characterized in that its constitution by weight is as follows:

| | |
|---|---|
| potassium salt | 0.5 to 5% |
| magnesium salt | 3 to 5% |
| calcium compounds | 5 to 15% |
| grains, oil or cattle cakes and/or vegetable wastes | 20 to 50% |
| ovine excrements and/or fowl droppings | remaining %. |

14. A process for fertilizing truffle beds for enhancing mycorhization and/or fructification of mycorhizal mushrooms selected from the group consisting of tuber melanosporum, comprising spreading on the bed at a rate of about 0.3 to 3 kg/m² a fertilizer having a pH of at least 8 and consisting essentially of a mixture of non-fermented organic substances of animal origin, organic substances of proteins and carbohydrates of vegetable origin, and at least one alkalizing compound for raising the pH of the mixture to greater than 8, the mutual proportions of the organic substances being adjusted so that the mixture has a C/N ratio of at least 10.

15. A fertilizing process as in claim 14, wherein the spreading is carried out annually at the end of each harvesting period, with the rate of the first spreading being equal to or larger than of the following.

16. A fertilizing process as in claim 14 and wherein said fertilizer has a pH of about 10 to 13.5 and a C/N ratio of about 11 to 14, and applying said fertilizer at a rate such as to raise the pH of the soil to about 8 to 9 and the C/N ratio of the soil is between about 10 and 12.

* * * * *